United States Patent [19]
Johnson, Jr. et al.

[11] Patent Number: 5,370,218
[45] Date of Patent: Dec. 6, 1994

[54] APPARATUS FOR HAULING COAL THROUGH A MINE

[75] Inventors: George F. Johnson, Jr., Pikeville; Arnemann R. Grender, Pippa Passes, both of Ky.

[73] Assignee: Johnson Industries, Inc., Pikeville, Ky.

[21] Appl. No.: 123,379

[22] Filed: Sep. 17, 1993

[51] Int. Cl.$^5$ .............................................. B65G 21/06
[52] U.S. Cl. .................... 198/860.1; 198/584
[58] Field of Search ............... 198/860.1, 860.2, 861.1, 198/584, 583; 299/43, 64

[56] References Cited

U.S. PATENT DOCUMENTS

| | | | |
|---|---|---|---|
| 3,796,503 | 3/1974 | Dawson | 198/860.1 X |
| 4,031,997 | 6/1977 | Nelson | 299/64 X |
| 4,390,211 | 6/1983 | Thompson | 299/57 |
| 4,696,236 | 9/1987 | Kanayama | 104/65 |
| 4,736,835 | 4/1988 | Hinkle | 198/860.1 |
| 4,754,864 | 7/1988 | Cross, Jr. | 198/364 |
| 5,108,153 | 4/1992 | Pennington et al. | 198/860.2 X |

FOREIGN PATENT DOCUMENTS 2125353 3/1984 United Kingdom ............ 198/860.2

*Primary Examiner*—James R. Bidwell
*Attorney, Agent, or Firm*—Frost & Jacobs

[57] ABSTRACT

A coal haulage apparatus is provided for use in moving coal fragments within the horizontal shafts of a coal mine on a belt conveyor that runs longitudinally along the apparatus. The apparatus is an assembly of multiple, like sections that each have a pair of longitudinal rails and cross members which join the rails together in a parallel, spaced-apart relationship, of which the rails are designed to receive the bottom portion of V-grooved wheels of a dolly that can move longitudinally along the top of each section of the coal haulage apparatus. The longitudinal rails essentially act as the frame that supports the vertical weight of the dolly which rolls along the top of each section of the coal haulage apparatus, and a separate vertical support frame is not required. The rails are made of square tubing that uses a smaller mating, connecting tube to join rails from one section to another adjacent section. The connecting tube is oriented such that the allowable deviation between sections in the vertical direction is much greater than the allowable deviation in the horizontal direction.

17 Claims, 3 Drawing Sheets

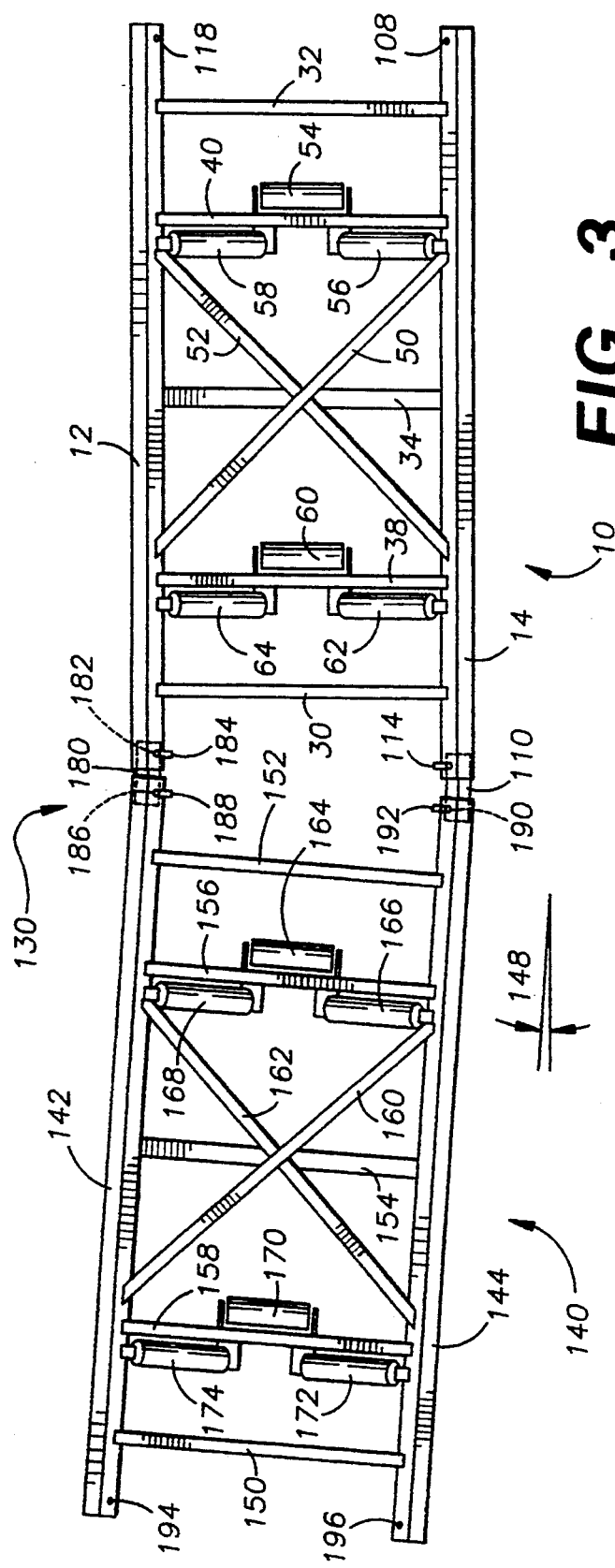
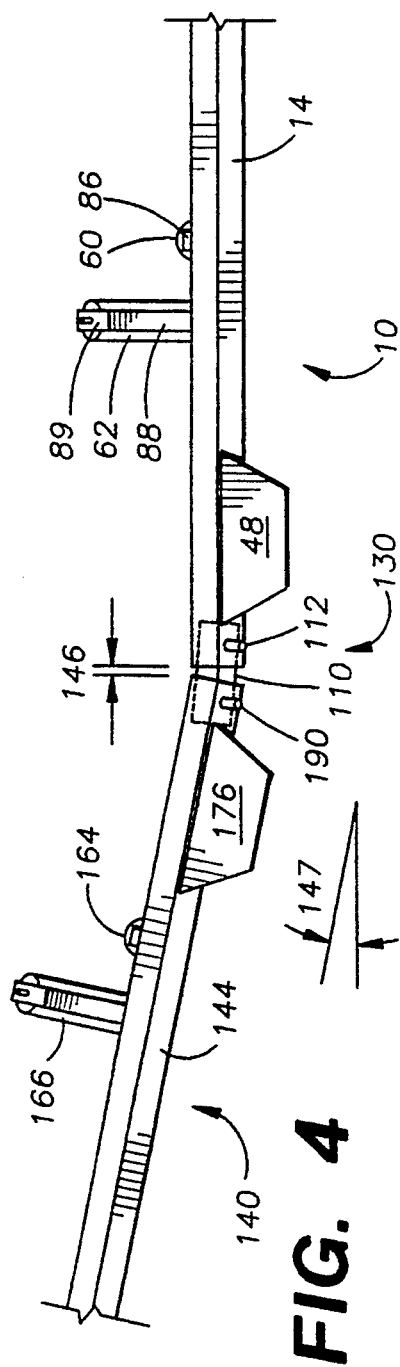
FIG. 3
FIG. 4

APPARATUS FOR HAULING COAL THROUGH A MINE

TECHNICAL FIELD

The present invention relates generally to coal haulage equipment and is particularly directed to sectional tracks mounting rails of the type which support small coal-carrying railroad cars or dollies as they transit tunnels in coal mines. The invention is specifically disclosed as a continuous coal haulage system that uses square tubing as both a rail and the frame of the sectional track, while also supporting a conveyor belt that runs in both directions (supply and return) of the track section. The track sections are joined together in a manner to allow for relatively great vertical deviations in track elevation from one section to the next, but not to allow significant horizontal deviations in track direction from one section to the next.

BACKGROUND OF THE INVENTION

Coal haulage systems have been available for use in coal mines to receive coal fragments presently being mined by a coal mining machine, and to carry that coal, by a belt conveyer, through substantially horizontal shafts. Modern coal mining machines include their own integral, flexible belt conveyor to continuously remove coal from the cutting area.

The coal from the above mining machine typically is transported to another conveyor system which has means to receive the coal from the conveyor of the mining machine, and further means to transport the coal through one section of the conveyor and to other downstream sections. A mobile type of bridge conveyor is disclosed in U.S. Pat. No. 4,031,997 (by Nelson). In Nelson, each of the bridge conveyors is wheeled and is configured to either receive coal from the mining machine, or to dump the coal into some other system (such as an elevator). Between the bridge conveyors are intermediate mobile conveyors, which are also wheel-mounted. The intermediate conveyors have inbye and outbye ends, of which the inbye ends use a pair of side rails to carry a dolly. The dolly has "V"-grooved wheels which mate to the rails, so that the dolly may move longitudinally along the intermediate conveyer. The dolly helps to receive the coal from one section of the conveyer such that the coal is directed onto the conveyor belt before further transportation toward another intermediate section, or to the final bridge conveyer.

Each of the rails that receives the "V"-grooved wheels is further supported by a generally vertical frame structure, which supports the weight of the dolly. This type of vertical frame arrangement is typical for coal mining conveyor systems.

Another type of conveyor system that uses "V"-grooved wheels is disclosed in U.S. Pat. No. 4,754,864 (by Cross). Cross discloses a conveyor that feeds material into a blending bin having a horizontal frame along its longitudinal axis. The V-grooved wheels are mated to a track member which is supported by a vertical frame member, also running along the longitudinal axis. In Cross, the V-grooved wheels allow the longitudinal movement of a gantry blade and diverter discharge device.

The existing coal haulage systems that use a dolly guided by a pair of rails all use some type of vertical frame structure to support the weight of the dolly. Because of this fact, such coal haulage systems are greater in vertical height than if the vertical frame sections were eliminated from the structure.

Existing coal haulage systems comprising of sections of track to support the dolly are difficult in joining one section to its adjacent section. The vertical frame which supports the rails typically has a male end which must fit inside a mating female end of its adjacent section. In such sectional coal haulage systems, the tolerance is relatively tight as to the clearance between the outer portions of the male mating member and the inner portions of the female mating member. The alignment of the holes for such screws or bolts is quite difficult when situated within an actual coal mine.

SUMMARY OF THE INVENTION

Accordingly, it is a primary object of the present invention to provide a coal haulage system in which the rails that mate with V-grooved wheels of a dolly also support the weight of the dolly, and do not require a separate vertical frame structure.

It is another object of the present invention to provide a coal haulage system that has a lower vertical profile than coal haulage systems presently available which use a conveyor belt to transport the coal, and which use a longitudinally-sliding dolly to help guide the coal onto the conveyor belt.

It is yet another object of the present invention to provide a coal haulage system that can be assembled in sections, in which a relatively large elevation change can be allowed between adjacent sections, but directional changes along the longitudinal axis are much more limited.

It is a further object of the present invention to provide a coal haulage system which can be assembled in sections, in which each section can be easily mounted to its adjacent sections without the use of sophisticated tools and with a relatively large clearance for ease of assembly.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved coal haulage apparatus is provided which is made up of multiple sections that each have a pair of longitudinal rails and cross members which join the rails together in a parallel, spaced-apart relationship. The longitudinal rails are designed to receive the bottom portion of a V-grooved wheel of a dolly, which can move longitudinally along the top of each section of the coal haulage apparatus. The dolly acts as a receiving point for coal to be disposed upon the upper flight of the conveyor belt, and at any particular time, can be positioned upon any one of the sections of the coal haulage apparatus. The rails have low profile skids attached to their bottom portions which rest upon the floor of a shaft in a coal mine. The cross members are designed to support both an upper flight and a lower flight of a moving belt conveyor, which can continuously transport coal directly across each of the sections of the coal haulage apparatus until the coal reaches a discharging point, typically at the final section of the coal haulage apparatus.

The longitudinal rails essentially act as the frame that supports the vertical weight of the dolly which rolls along the top of each section of the coal haulage apparatus. No extra vertical support frame is required. In one preferred embodiment, the rails comprise a hollow square tube which has its sides at a 45° angle from the horizontal. This tube is large enough in width that a mating, connecting tube having a smaller width dimension can be easily inserted inside the open area of the main rail's hollow tube. This connecting tube is held in place by a mounting pin, which can be easily inserted by hand once the connecting tube is placed inside the hollow area of the main rail. Once the pin has been placed, an adjacent section of the present coal haulage apparatus can be moved into position so that its main rail can be mounted to the other half of the connecting tube by a similar pinning arrangement. In joining the sections together, the connecting tube has a large amount of clearance so that the rails can be easily joined together by use of the mounting pins, and without the use of any sophisticated tools.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 3 is a top plan view of two sections joined together, each section comprising one of the coal haulage apparatus depicted in FIG. 1.

FIG. 4 is a side elevational view of two sections joined together, each section comprising one of the coal haulage apparatus depicted in FIG. 1.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
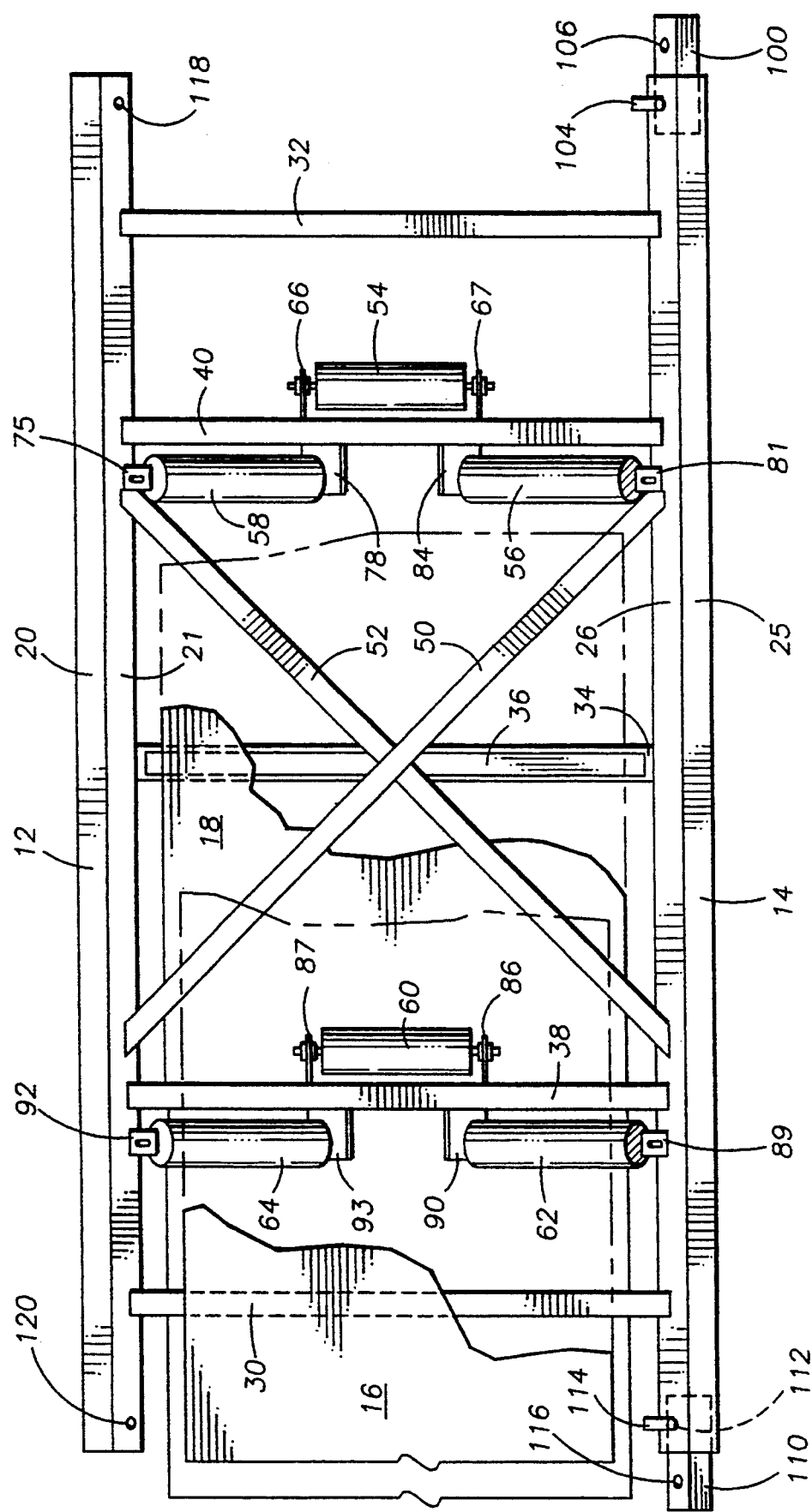
FIG. 1 is a top plan view of a coal haulage apparatus constructed in accordance with the principles of the present invention.

Referring now to the drawings, FIG. 1 shows a coal haulage apparatus, generally designated by the index numeral 10, having an overall rectangular shape as viewed from above. A first longitudinal rail 12 is located parallel to a second longitudinal rail 14, these two rails making up a portion of the perimeter of coal haulage apparatus 10, along two of its sides. Each of these longitudinal rails preferably is a 4"×4" (10.2×10.2 cm) tube, ten feet (10'=3.05 m) in length. Each of tubes 12 and 14 are preferably oriented such that their sides form a 45° angle with the horizontal. The thickness of each of the walls of tubes 12 and 14 preferably is $\frac{3}{8}$ inches ($\frac{3}{8}''$=9.5 mm).

Located along certain portions of coal haulage apparatus 10 are an upper flight 16 and a lower flight 18 of a belt conveyer, which preferably is thirty-six inches (36"=91.4 cm) wide. Upper flight 16 is used to carry fragments of mined coal, typically from the coal mining machine to a dump point. Upper flight 16 would generally travel across a multiple number of sections of coal haulage apparatus 10 which are linked together from end-to-end. Upper flight 16 would travel along all of these sections, and then return along all the sections as lower flight 18.

Rail 12 has four side portions, an upper-outer side 20, an upper-inner side 21, a lower-outer side 22, and a lower-inner side 23. These sides can best be viewed in FIG. 2. Rail 14 also has four sides, as follows: an upper-outer side 25, an upper-inner side 26, a lower-outer side 27, and a lower-inner side 28. As related above, each of these sides is preferably oriented at a 45° angle compared to the horizontal.

Coal haulage apparatus 10 includes various cross members that are used to hold rails 12 and 14 in their spaced-apart parallel relationship. The outermost cross members are designated by the index numerals 30 and 32, and each comprise a 2"×2" (5.1×5.1 cm) tube. Cross members 30 and 32 are mounted to rails 12 and 14 along their sides 21 and 26, respectively. The preferred means of attachment is by welding, and the preferred material of rails 12 and 14, and cross members 30 and 32, is mild steel (for ease in welding).

A middle cross member 34 is attached below the bottom portions of rails 12 and 14 by use of shims 42 and 46, and wedge pieces 43 and 47. Middle cross member 34 is thereby oriented at a lower level as compared to cross members 30 and 32, and is used to support the weight of lower flight 18 of the belt conveyer. Middle cross member 34 preferably is made from a 1"×3" (2.5×7.6 cm) bar stock (also of mild steel), and preferably is fifty-one inches (51"=129.5 cm) in length. Attached to the top surface of cross member 34 is a "wear bar" 36, which is preferably made of a low friction material so that lower flight 18 will easily slide over its upper surface. Such a low friction material could be a high carbon content steel, or a stainless steel. The preferred dimensions of wear bar 36 are $\frac{3}{8}''$×2"×44" (0.95×5.1×111.8 cm). It will be understood that a roller could be optionally substituted for wear bar 36 if low friction is more important than low height for a particular installation.

Two other cross members 38 and 40 are preferably used to support rollers that hold in place and support the upper flight 16 of the belt conveyer. Each of cross members 38 and 40 preferably comprise a 2"×2" (5.1×5.1 cm) tube made of mild steel, and is attached to the upper-inner sides 21 and 26, respectively of rails 12 and 14. These attachment points are preferably at the same elevation as the attachment points for cross members 30 and 32.

To provide both lateral support and to help prevent twisting of rails 12 and 14 with respect to one another, a pair of cross members 50 and 52 are provided which essentially form an "X" pattern as viewed in a top plan view such as FIG. 1. X-cross members 50 and 52 are preferably each made of mild steel, and have the dimensions $\frac{1}{4}''$×2"×70" (0.6×5.1×177.8 cm).

Figure 2:
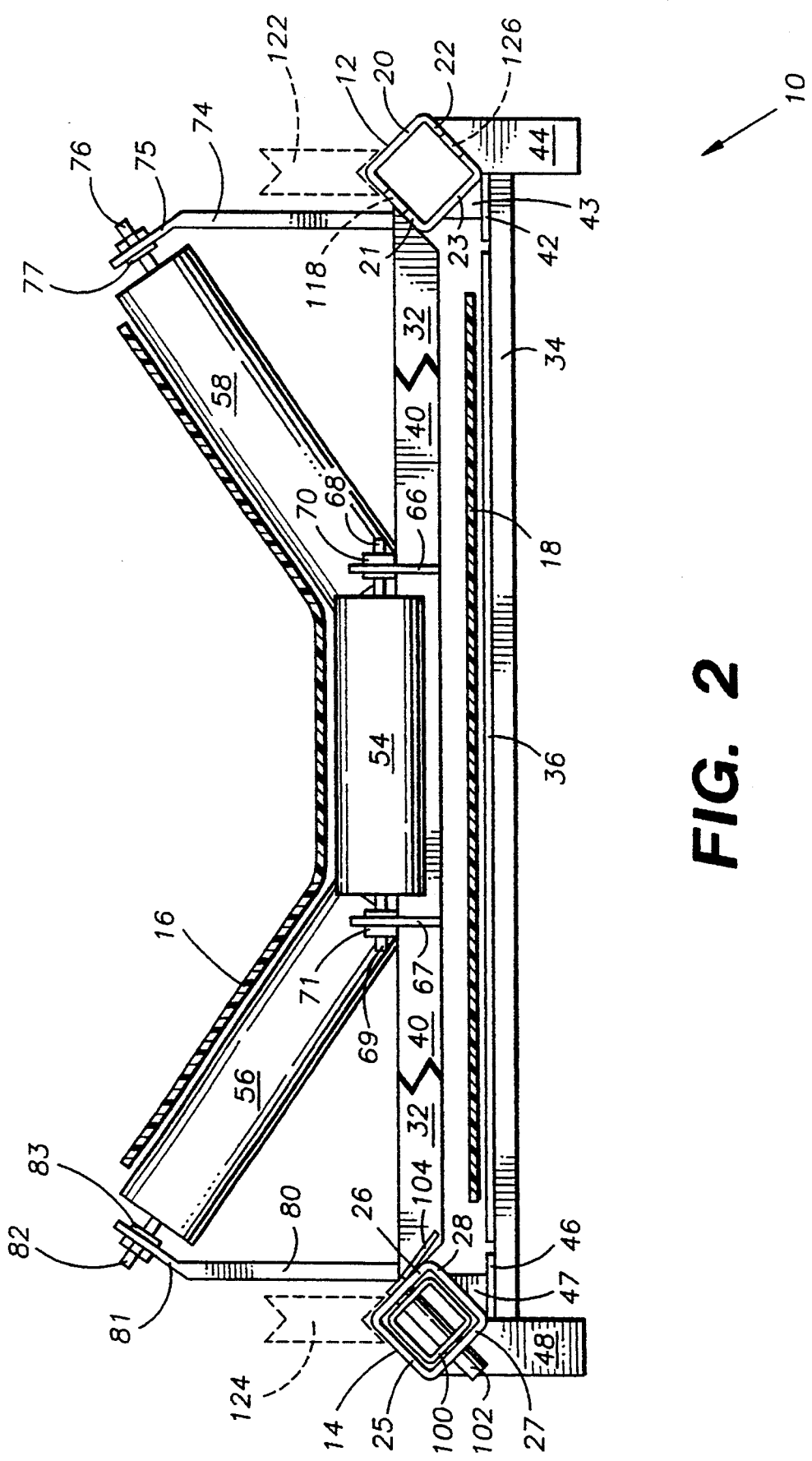
FIG. 2 is an end elevational view of the coal haulage apparatus depicted in FIG. 1.

As best viewed in FIGS. 2 and 4, a skid 48 is located along one of the corners of coal haulage apparatus 10 and is permanently attached to rail 14 along its lower-outer side 27. The preferred dimensions of skid 48 are two and three-eights (2⅜"=6.0 cm) wide by seven inches (7"=17.8 cm) in height along its outermost edge, and ten inches (10"=25.4 cm) long at the point where it touches the floor, which length increases to approximately twenty inches (20"=50.8 cm) along its outermost edge where it is fixedly attached to lower-outer side 27. A similar skid is located at each of the four corners of coal haulage apparatus 10 for ease of placement upon the floor of a horizontal mine shaft, and for ease in handling while being moved. One such similar skid 44 is attached to the lower-outer side 22 of rail 12.

The "lower" level cross member 34 is oriented such that there is approximately a three inch (3"=7.6 cm) gap from the floor of the mine to the bottom portion of cross member 34. The height of skids such as skids 44 and 48 are largely determinative of this dimension. The "upper" level cross members 30, 32, 38, and 40 are arranged such that there is a two inch (2"=5.1 cm) nominal gap from the top surface of the wear bar 36 to the bottom surfaces of the "upper" level cross members. This two inch (2"=5.1 cm) gap is to allow room for lower flight 18 to travel easily throughout coal haulage apparatus 10.

Longitudinal rails 12 and 14 are of sufficient mechanical strength to support the weight of not only the conveyor belt transporting coal fragments, but also of a dolly (not shown) having wheels 122 and 124 which roll along the upper portions of rails 12 and 14. No extra support frame is required to help maintain the vertical structural integrity of coal haulage apparatus 10. Since there is no requirement for an extra support frame along the longitudinal perimeter of coal haulage apparatus 10, the entire profile of coal haulage apparatus 10 can be quite low, as discerned by an inspection of FIG. 2. The skids 44 and 48 could provide an even lower amount of vertical clearance between the bottom of the "lower" cross member 34 and the floor of the coal mine, if desired. Since the floor of a horizontal coal mining shaft is not perfectly flat, it is preferably that a certain minimum clearance be maintained, such as the preferred distance of three inches (3"=7.6 cm).

Cross member 40 supports a set of rollers designated by the index numerals 54, 56, and 58. As best viewed in FIG. 2, roller 54 is a center roller, and rollers 56 and 58 are side rollers that are oriented preferably at a 35° angle from the horizontal. The orientation of these three rollers tends to shape the upper flight 16 of the belt conveyer so that it easily holds the fragments of mined coal as the belt moves along the rollers. A similar set of rollers 60, 62, and 64 are supported by cross member 38. It will be understood that wear bars could be optionally substituted for rollers 54, 56, 58, 60, 62, and 64, if low height is more important than low friction for a particular installation.

Roller 54 is held in place by a pair of mounting brackets 66 and 67 which are rigidly attached to cross member 40. Center rods 68 and 69 extend from each end of roller 54, and rotatably engage one of the retainers 70 and 71, which are attached to mounting brackets 66 and 67. The overall assembly that contains center roller 54 is made so that the roller can be easily and quickly replaced upon breakage or wear, and such an arrangement is well known in the art.

Side rollers 56 and 58 are similarly attached to mounting supports and mounting brackets. Side roller 56 has an associated vertical mounting support 80 which has a bend leading to a mounting bracket portion 81 that is oriented at a 35° angle from the vertical. Mounting bracket 81 is used to support a retainer 83, which in turn, receives a center rod 82 of roller 56. A similarly angled mounting bracket 84 (see FIG. 1) is used to hold the opposite end of side roller 56.

In a similar manner, side roller 58 has a vertical mounting support 74 which has a bend leading to a mounting bracket portion 75 (at a 35° angle from the vertical). Mounting bracket 75 supports a retainer 77 which holds a center rod 76 of roller 58. A mounting bracket 78 supports the opposite end of side roller 58. Instead of using a thirty-six inch (36"=91.4 cm) wide belt, a forty-two inch (42"=106.7 cm) wide conveyor belt can be also utilized.

Roller 60, 62 and 64 have similar means for mounting, in that roller 60 has a pair of brackets 86 and 87, roller 62 has a pair of mounting brackets 89 and 90, and roller 64 has a pair of mounting brackets 92 and 93. In addition, roller 64 has an associated vertical mounting support 88 (see FIG. 4), and side roller 64 has a similar vertical mounting support which is not shown.

Coal haulage apparatus 10 is designed to be modular in that it can be joined or operably connected to similarly configured adjacent sections. A connecting tube 100 is used to implement the joining of more than one section of coal haulage apparatus of the present invention into an assembly of such sections. Connecting tube 100 is preferably a square tube having the dimensions 3"×3"×10" (7.6×7.6×25.4 cm), and is made to easily slip inside the hollow portions of the larger rails 12 and 14.

Each of the four corners of coal haulage apparatus 10 has a mounting hole, such as holes 118 and 120 through the upper-inner side 21 of rail 12. These holes are preferably sized at 1⅛" (2.8 cm) in diameter. A similar through-hole is located along the opposite side, such as the hole 126 in the lower-outer side 22 of rail 12 (see FIG. 2). The size of hole 126 preferably also is 1⅛" (2.8 cm) in diameter.

Similar holes are also placed near the ends of rail 14 in its upper-inner side 26, and these holes are designed to receive a round pin 102 which preferably is one inch (1"=2.5 cm) in diameter. As is easily discerned from these dimensions, pin 102 has one-sixteenth inch (1/16"=1.6 mm) clearance all around its diameter as compared to its retaining hole (not shown). Pin 102 is easily handled by its permanently attached handle 104, which preferably has the dimensions ¼" thickness×1" width×2½" length (0.6×2.5×6.3 cm). Handle 104 is attached to only one side of pin 102, so that there will be clearance along the upper portions of upper sides 25 and 26 of rail 14. This clearance is provided so that the "V"-grooved wheels, such as wheel 124, of the dolly (not shown) can travel along these upper portions of rails 14. As can be best viewed in FIG. 2, a similar "V"-grooved wheel 122 would be able to roll along the upper portions of upper sides 21 and 20 of rail 12.

Pin 102 slides through a through-hole in the upper-inner side 26 and lower-outer side 27 of rail 14, as related above. In addition, pin 102 slides through similarly sized holes in similar portions of connecting tube 100. In this manner, connecting tube 100 is affixed to the end of rail 14 of coal haulage apparatus 10. Since connecting tube 100 is 3"×3" (7.6×7.6 cm) along its sides, and rail 14 is 4"×4" (10.2×10.2 cm) along its sides and has a ⅜" (9.5 mm) wall thickness, there will be approximately ⅛" (3.2 mm) clearance around the entire surface of connecting tube 100 as it is being installed into the interior opening of rail 14. This is important for ease of installation inside a coal mine shaft as the various sections of the coal haulage apparatus of the present invention are being joined together at their ends. Since the sections of coal haulage apparatus 10 are so easy to install, no specialized tools are required, and in fact, pin 102 can be inserted by hand through the holes in the sides of rail 14 and connecting tube 100.

Once connecting tube 100 is in place within rail 14, (i.e., after pin 102 has been inserted through hole 108 (see FIG. 3)), an adjacent section of coal haulage apparatus 10 can be moved into place and one of its longitudinal rails can be pinned into place by another similar pin being inserted through that section's longitudinal rail and through the second hole 106 in connecting tube 100. As related above, all holes in all rails and connecting tubes are preferably one and one-eighth inches (1⅛"=2.8 cm) in diameter, and all pins are preferably one inch (1"=2.5 cm) in diameter, thereby providing a large amount of clearance for ease of installation. At the opposite end of rail 14 is a second connecting tube 110, having a hole (not shown) through which a pin 112 is placed, via its handle 114 for ease of handling. A second hole 116 is located in connecting tube 110 for use in being adjoined into another adjacent section 140 at this end of coal haulage apparatus 10.

FIGS. 3 and 4 show the assemblage 130 of two sections, designated by the index numerals 10 and 140, of coal haulage apparatus that are joined by connecting tubes 110 and 180. The second section 140 is of similar construction to the first section 10, including longitudinal rails 142 and 144, cross members 150 and 152, a lower cross member 154, and upper cross members 156 and 158 having rollers. In addition, section 140 has similar "X"-cross members 160 and 162. Cross member 156 supports three rollers, center roller 164, and side rollers 166 and 168. Similarly, cross member 158 supports three rollers, a central roller 170, and side rollers 172 and 174. As seen in FIG. 4, a skid 176 is provided along the corner nearest rail 14 of coal haulage apparatus 10, in which skid 176 is permanently affixed to rail 144 of section 140.

Rails 142 and 144 contain mounting holes 194 and 196, respectively, which are preferably 1⅛" (2.8 cm) in diameter, and are used in conjunction with round pins (not shown) attached to another adjacent section (not shown) of the coal haulage apparatus 130. A round pin 182 having a handle 184 is placed through mounting holes in rail 12 and connecting tube 180, in a similar fashion to the mounting procedure described for pin 112 with rail 14 and connecting tube 110. The other half of connecting tube 180 is inserted within the hollow space of rail 142 and attached by use of pin 186 having a handle 188. In a similar manner, the other half of connecting tube 110 is inserted within the hollow space of rail 144, by use of pin 190 having a handle 192.

The nominal gap, designated by the index numeral 146 (see FIG. 4), between the two sections 10 and 140 of coal haulage apparatus 130 is designed to be one-quarter of an inch (¼"=0.6 cm). By virtue of this gap 146, section 140 can be oriented at an angle (designated by the symbol 147 on FIG. 4) in the vertical plane from the angle of section 10. Using the preferred dimensions described hereinabove, and taking into account the provided clearances, the maximum elevational change along a single ten toot (10'=3.05 m) length of section (e.g., section 140) will be approximately twelve inches (12"=30.5 cm). This maximum elevational change corresponds to a maximum value of 5.7° for vertical angle 147. This relatively large angle is designed into the coal haulage apparatus 130 of the present invention so as to allow the necessary flexibility for use within horizontal coal mining shafts. The dolly (not shown) that rides along the top surfaces of the rails will thereby be able to undulate up and down as needed as it travels along the plurality of sections of the coal haulage apparatus of the present invention. This angle 147 has been exaggerated on FIG. 4, for purposes of clarity in the drawings.

The associated cross members of parallel rails 12 and 14 of section 10 do not allow twisting or other movement in the longitudinal or transverse direction. This prevents the angle of horizontal deviation (designated by the symbol 148 in FIG. 3) from being as large as the vertical angle 147 of allowable deviation between sections of the present coal haulage apparatus. Although the same amount of clearance between rails 12 and 14 and connecting tubes 180 and 110 is available in the horizontal direction as is available in the vertical direction, because of the aforementioned fixed horizontal rails 12 and 14 (and of rails 142 and 144 of section 140), the allowable directional variation in the horizontal plane is severely limited as compared to the allowable deviation in the vertical plane.

Using the preferred dimensions and clearances, the maximum deviation in the horizontal plane is two inches (2"=5.1 cm) along one ten foot (10'=30.5 cm) section (such as section 140). This limits the maximum value of horizontal angle 148 to about 0.95°. This angle has been exaggerated on FIG. 4, for purposes of clarity in the drawings. This limited horizontal deviation is desirable, first, so that the wheeled dolly can easily slide from one section of the coal haulage apparatus of the present invention to another section without having to incur any substantial directional changes in the horizontal plane, and second, so that the conveyor belt will not "de-rail." Since the dolly is attached to the end of a conveyor system that is integral to the mining machine, the dolly will continually be moving back and forth along the rails of coal haulage apparatus 130. As related above, it is desirable to allow the dolly to undulate in the vertical plane, but it is undesirable to have the dolly trying to negotiate directional changes in the horizontal plane. The coal haulage apparatus of the present invention provides the very flexibility and limitations that are desired for use in a coal mining operation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A coal haulage system engageable with a movable low profile wheeled dolly and supporting a portion of a continuous belt conveyor's upper flight and lower flight, said coal haulage system comprising:

(a) a frame structure comprising:
- (i) a pair of tubular side members in parallel, spaced-apart relationship running in the longitudinal direction of said coal haulage system, said tubular side members carrying a dolly by engaging the wheels of said dolly, said tubular side members each having a first end and a second end;
- (ii) a plurality of transverse cross-members, said cross-members being attached to and extending between both of said tubular side members and fixedly holding said tubular side members in said spaced-apart relationship;
- (iii) a plurality of mounting members, said mounting members being configured to touch the surface said frame structure rests upon, said mounting members being directly attached to bottom portions of said tubular side members; and (b) each said first and second ends of each of said tubular side members being configured to mate with a connecting member placeable within each of said tubular side members and which additionally mates with a correspondingly configured end of an adjacent tubular side member, one of said connecting members and each of said first and second ends of each tubular side member being operationally attached to one another by a joining mechanism.

2. The coal haulage system as recited in claim 1, wherein said tubular side members each comprise square tubing configured such that each of its side walls is oriented at a substantially 45° angle to the horizontal.

3. The coal haulage system as recited in claim 2, wherein the wheels of said dolly are V-shaped and said tubular side members each include a peripheral portion that is engageable with said V-shaped wheels.

4. The coal haulage system as recited in claim 1, wherein some of said transverse cross-members are attached to said tubular side members in a generally perpendicular configuration, and other of said transverse cross-members are attached to said tubular side members in a generally X-shaped arrangement.

5. The coal haulage system as recited in claim 1, wherein said tubular side members provide the vertical and the longitudinal horizontal structural strength of said frame structure, and said cross-members provide the transverse horizontal structural strength of said frame structure.

6. The coal haulage system as recited in claim 1, wherein said transverse cross-members include means for supporting the upper flight and lower flight of said conveyor, said means for supporting the upper flight of said conveyor comprising one of a set of rollers and a set of wear bars, and said means for supporting the lower flight of said conveyor including one of a low friction wear bar and a roller.

7. The coal haulage system as recited in claim 6, wherein said means for supporting the upper flight and lower flight of said conveyor are so configured as to accommodate conveyor belts having different widths.

8. A coal haulage system engageable with a movable low profile wheeled dolly and supporting a portion of a continuous belt conveyor's upper flight and lower flight, said coal haulage system comprising:

(a) frame structure comprising:
a pair of tubular side members in parallel, spaced-apart relationship running in the longitudinal direction of said coal haulage system, said tubular side members carrying a dolly by engaging the wheels of said dolly, said tubular side members each having a first end and a second end, said tubular side members each comprising square tubing configured such that each of its side walls is oriented at a substantially 45° angle to the horizontal;
- (ii) a plurality of transverse cross-members, said cross-members being attached to and extending between both of said tubular side members and fixedly holding said tubular side members in said spaced-apart relationship;
- (iii) a plurality of mounting members, said mounting members being configured to touch the surface said frame structure rests upon, said mounting members being directly attached to bottom portions of said tubular side members; and (b) each said first and second end of each of said tubular side members being configured to mate with a connecting member which additionally mates with a correspondingly configured end of an adjacent side member, said connecting member comprising square tubing configured such that each of its side walls is oriented at a substantially 45° angle to the horizontal, said connecting member being smaller in size than said tubular side members such that the connecting member is placeable within the space between the side walls of said tubular side members.

9. The coal haulage system as recited in claim 8, wherein the mating of said connecting member to either the first or second end of one of said tubular side members is accomplished by use of a pin placed through holes in two of the side walls of the tubular side member and through corresponding holes in two of the side walls of the connecting member.

10. A coal haulage system comprising at least one rectilinear assembly engageable with a movable low profile wheeled dolly and supporting a portion of a continuous belt conveyor's upper flight and lower flight, said at least one rectilinear assembly comprising:

(a) a pair of spaced-apart, parallel rails running in the longitudinal direction of said rectilinear assembly, said rails each having a first end and a second end, said rails being held in their spaced-apart configuration by a plurality of transverse cross-members which are attached to both of said rails, the combination of said rails and cross-members comprising a frame structure of which said rails provide the vertical and longitudinal structural strength of said frame structure and said cross-members provide the transverse structural strength of said frame structure, each of said rails being hollow;

(b) a portion of said conveyor mounted on said frame structure, said conveyor having an upper flight and a lower return flight, said conveyor running longitudinally between said rails, said conveyor including means for transporting coal fragments;

(c) a plurality of mounting members for supporting said conveyor against the surface said rectilinear assembly rests upon, said mounting members being attached to said frame structure; and (d) a joining mechanism for joining said rails to similar rails of adjacent rectilinear assemblies, said joining mechanism being located at each of said first and second ends of both of said rails and within the hollow space of those rails, said joining mechanism being operationally attached to said rails and similar rails of adjacent rectilinear assemblies for each of said pair of parallel rails.

11. The coal haulage system as recited in claim 10, wherein said each rails comprise square tubing configured such that each of its side walls is oriented at a substantially 45° angle to the horizontal and thereby disposed so as to engage V-shaped wheels of a movable low profile dolly.

12. A coal haulage system comprising at least one rectilinear assembly engageable with a movable low profile wheeled dolly and supporting a portion of a continuous belt conveyor's upper flight and lower flight, said at least one rectilinear assembly comprising:
(a) a pair of spaced-apart, parallel rails running in the longitudinal direction of said rectilinear assembly, said rails each having a first end and a second end, said rails being held in their spaced-apart configuration by a plurality of transverse cross-members which are attached to both of said rails, the combination of said rails and cross-members comprising a frame structure of which said rails provide the vertical and longitudinal structural strength of said frame structure and said cross-members provide the transverse structural strength of said frame structure, said each rails comprising square tubing configured such that each of its side walls is oriented at a substantially 45° angle to the horizontal and thereby disposed so as to engage V-shaped wheels of a movable low profile dolly;
(b) a portion of said conveyor mounted on said frame structure, said conveyor having an upper flight and a lower return flight, said conveyor running longitudinally between said rails, said conveyor including means for transporting coal fragments;
(c) a support structure for supporting said conveyor, said support structure being attached to said frame structure; and
(d) a joining mechanism for joining said rails to similar rails of adjacent rectilinear assemblies, said joining mechanism being located at each of said first and second ends of both of said rails, said joining mechanism comprising square tubing configured such that each of its side walls is oriented at a substantially 45° angle to the horizontal, said joining mechanism being smaller in size than said rails such that the joining mechanism is placeable within the space between the side walls of said rails.

13. The coal haulage system as recited in claim 12, wherein the mating of said joining mechanism to either the first or second end of one of said rails is accomplished by use of a pin placed through holes in two of the side walls of the rail and through corresponding holes in two of the side walls of the joining mechanism.

14. A coal haulage system engageable with a movable low profile wheeled dolly, said coal haulage system comprising:

(a) a plurality of sections joined together to form a continuous dolly track and a continuous belt conveyor having upper and lower flights, each said section including a frame structure comprising:
(i) a pair of dolly supporting tubular side members in parallel, spaced-apart relationship running in the longitudinal direction of said coal haulage system, said tubular side members engaging the wheels of said dolly, said tubular side members each having a first end and a second end;
(ii) a plurality of transverse cross-members, said cross-members being attached to and extending between both of said tubular side members and fixedly holding said tubular side members in said spaced-apart relationship;
(iii) a plurality of mounting members, said mounting members being configured to touch the surface said frame structure rests upon, said mounting members being directly attached to bottom portions of said tubular side members;
(iv) means for joining the tubular side members of two adjacent said frame structures in end-to-end relationship;
(b) a plurality of connecting members acting as said joining means and configured to mate with said tubular side members of each section, each said connecting member having a tubular shape that is operably connected to either a first or second end of one of said tubular side members of a first section of the plurality of sections, and is additionally operably connected to either a first or second end of one of said tubular side members of an adjacent second section of the plurality of sections; and
(c) means for directing a belt conveyor so that its upper and lower flights travel in a longitudinal direction along each of said sections forming a continuous means for hauling coal from a receiving point of said coal haulage system to its discharging point.

15. The coal haulage system as recited in claim 14, wherein said joining means provides more allowable deviation, between said first section and said second section of the plurality of sections, in the vertical direction than in the horizontal direction.

16. The coal haulage system as recited in claim 1, wherein each said joining mechanism operates to mate each said connecting member and its corresponding tubular side member end at a single point thereby providing a one-point pivotable joint per end of each said tubular side member with respect to its corresponding connecting member.

17. The coal haulage system as recited in claim 10, wherein the attachment of each said rail and its corresponding joining mechanism is at a single point, thereby providing a one-point pivotable joint per end of each said rail with respect to its corresponding joining mechanism.

* * * * *